Patented July 31, 1928.

1,679,277

UNITED STATES PATENT OFFICE.

HERMANN STAUDINGER, OF ZURICH, RICHARD TOBLER AND ROBERT STOCKER, OF BASEL, JAKOB MÜLLER, OF MUNCHENSTEIN, NEAR BASEL, AND ARMIN BUCHER, OF BASEL, SWITZERLAND, ASSIGNORS TO SOCIETY OF CHEMICAL INDUSTRY IN BASLE, OF BASEL, SWITZERLAND.

INDIGOID DYESTUFF.

No Drawing. Application filed November 24, 1923, Serial No. 676,858, and in Switzerland December 7, 1922.

The present invention relates to indigoid dyestuffs. It comprises the new dyestuffs, as well as the material dyed with these dyestuffs.

It has been found that indigoid dyestuffs are obtained by reacting the compounds of the general formula:

$$\begin{array}{c} C_1\text{———}C_4=O \\ | \quad\quad | \\ C_2\text{———}C_3=x \\ \diagdown S \diagup \end{array}$$

(wherein $C_1$ and $C_2$ denote two carbon atoms of a naphthalene nucleus in ortho-position to each other, $C_1$ being a $\beta$-carbon atom and wherein $C_3$ denotes a carbon atom to which there are attached exchangeable radicals $x$, such as O, two halides, one anil, $H_2$), on reactive compounds of the general formula:

$$\begin{array}{c} m\text{———}C=O \\ | \quad\quad | \\ n\text{———}C=y \\ \diagdown r \diagup \end{array}$$

(wherein $y$ denotes an exchangeable group, such as O, two halides, one anil, $H_2$, and wherein $m$, $n$, and $r$ denote atoms or residues of which two are carbon atoms adjacent to each other, which at the same time belong to a ring of the benzene series, and of which the third atom may be NH or S).

As compounds of the general formula:

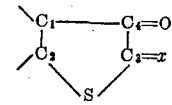

there may be mentioned the 1:2- and 2:3-thionaphthisatins, the 1:2- and 2:3- naphth-thio-indoxyls, their halides and anils, as well as the halogen-substitution products of these compounds.

As compounds of the general formula:

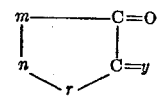

there may be mentioned quite commonly five-membered condensed ring systems, such as isatins, indoxyls, thioisatins, thioindoxyls, and so forth, homologues and substitution products as well as halides and anils of these compounds.

The reactions which take place are illustrated by the following equations:

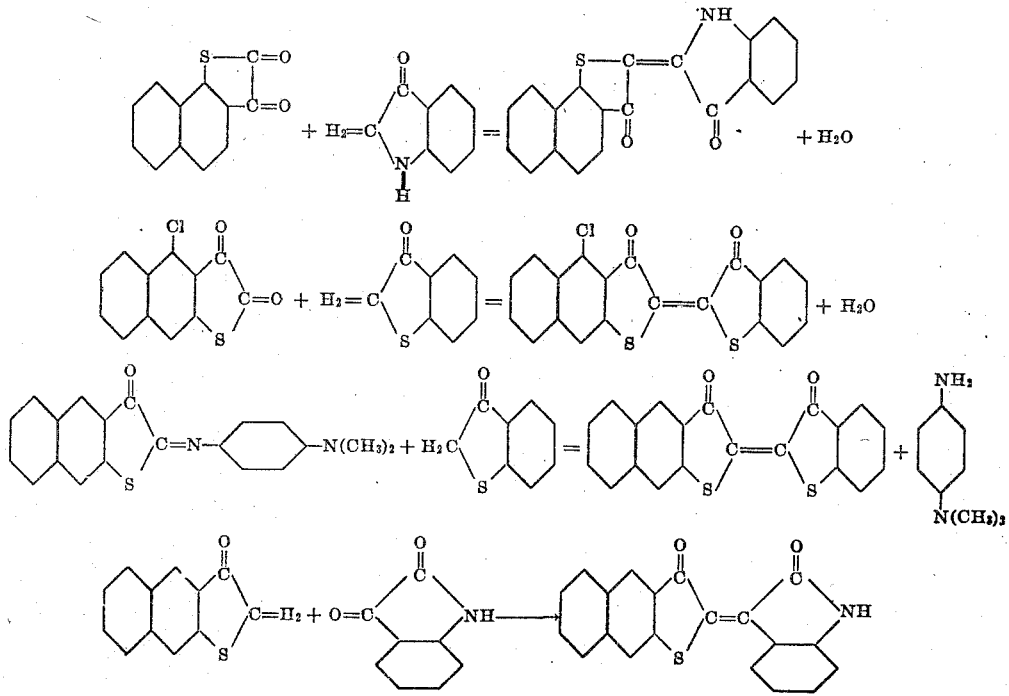

All of these new dyestuffs are characterized by the symmetrical grouping

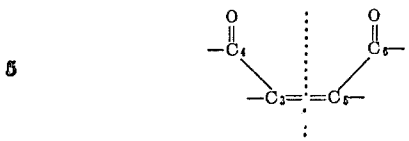

the first member of which is attached by the carbon atom $C_3$ to the sulfur atom of a thionaphthol nucleus and by the carbon atom $C_4$ to the same thionaphthol by means of a β-carbon atom in ortho position to the sulfur atom, and in the second member of which $C_5$ and $C_6$ appertain to any five-membered condensed cyclic complex. The dyestuffs thus obtained may be further halogenated.

The shades and properties of some of the dyestuffs are given in the table hereinafter.

*Example 1.*

248.5 parts of 4-chloro-1:2-thionaphthisatin and 177 parts of indoxylcarboxylic acid are suspended in 5000 parts of alcohol and the mixture is heated for several hours to boiling. The mixture is then filtered and the dyestuff washed with alcohol and dried. It is a blue violet powder which dissolves in concentrated sulfuric acid to a green solution. It yields an olive-green vat which dyes cotton powerful blue violet tints which are very fast.

The new dyestuff corresponds most probably with the following formula:

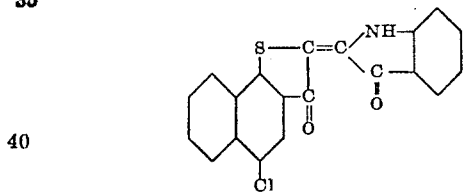

The same result is obtained if, instead of the 4-chloro-1:2-thionaphthisatin, there are employed the corresponding anils and chlorides, which compounds are of the same degree of oxidation as the isatin itself.

*Example 2.*

305 parts of 5:7-dibromo-isatin are suspended in 3000 parts of chlorobenzene and the mixture is heated with addition of 229 parts of phosphorus pentachloride. The solution of 5:7-dibromo-isatin-chloride thus obtained is allowed to flow, while stirring, at 70–80° C., into a solution of 234.5 parts of 4-chloro-1:2-naphththioindoxyl in 2000 parts of chlorobenzene; the dyestuff separates immediately.

After washing, filtering, and drying, the dyestuff is obtained as a red violet powder which dissolves in sulfuric acid to a blue green solution. The dyestuff yields a yellow red vat and dyes cotton violet tints of very good fastness.

*Example 3.*

214 parts of 1:2-thionaphthisatin and 194 parts of oxythionaphthenecarboxylic acid are suspended in 4000 parts of alcohol and the mixture is heated to boiling after addition of 5 parts of calcined sodium carbonate. A short boiling completes the condensation. The dyestuff separates in very good yield and is filtered, washed and dried. It is a brown red powder, which dissolves in sulfuric acid to a bright green solution. In its reddish-golden vat it dyes cotton Bordeaux red tints.

346 parts of this dyestuff are added to 8000 parts of nitrobenzene and the mixture is mixed with 180 parts of bromine. In the course of a day the temperature is gradually raised to 180° C. during which operation a lively evolution of hydrogen bromide is to be observed. When the mixture is cooled the new product separates in the form of brown lustrous crystals. It dissolves in sulfuric acid to an intensely green solution and in its golden-yellow vat dyes cotton powerful and luminous Bordeaux tints which are very fast to soap.

The new dyestuff corresponds most probably with the following formula:

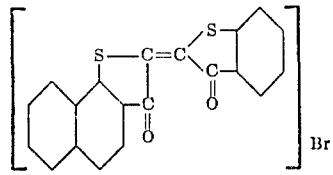

*Example 4.*

214 parts of 1:2-thionaphthisatin and 209 parts of 6-aminothioindoxylcarboxylic acid are introduced into 7000 parts of alcohol and the mixture is boiled for some hours in a reflux apparatus. The condensation may be hastened by the addition of some ammonia or dimethylaniline. When condensation is complete the mixture is filtered and the dyestuff washed and dried. It forms a blackish-brown powder which dissolves in sulfuric acid of 98 per cent strength to a green blue solution. With hydrosulfite and caustic soda solution it yields an orange brown vat which dyes wool and cotton fast brown tints. By brominating or benzoylating this dyestuff, for instance in the presence of pyridine, products of enhanced fastness to chloride are obtained.

*Example 5.*

200 parts of 1:2-napththioindoxyl and 222 parts of α-isatin anilide are suspended in 4000 parts of alcohol and after addition of 5 parts of calcined sodium carbonate the mixture is heated to boiling. After boiling is continued for a short time the condensation is at an end. The dyestuff which separates in very good yield is filtered, washed and dried. It is a dark brown powder which dissolves in sulfuric acid to a green blue solution. It forms a green yellow vat and dyes cotton violet grey tints which become pure grey when soaped.

329 parts of this dyestuff are introduced into 6000 parts of nitrobenzene and the whole is mixed with 176 parts of bromine. The mixture is allowed to rest for 24 hours, after which its temperature is raised gradually to 120° C. during 20 hours. The cooled mixture is filtered and the material on the filter is washed thoroughly with alcohol and dried. The new dyestuff is a violet powder which dissolves in sulfuric acid to a green blue solution. It dyes cotton from a golden yellow vat blue violet tints which become a violet of good fastness when soaped.

*Example 6.*

248.5 parts of 1-chloro-2:3-thionaphthisatin and 194 parts of oxythionaphthenecarboxylic acid are introduced into 10,000 parts of alcohol and the mixture is boiled in a reflux apparatus for some time. The dyestuff formed is filtered, washed and dried.

The new dyestuff is a violet red powder, dissolves in concentrated sulfuric acid to an olive green solution and yields with hydrosulfite and caustic soda solution a yellow vat which dyes cotton red violet tints which are very fast to light, washing, boiling and chlorine.

The new dyestuff corresponds most probably with the following formula:

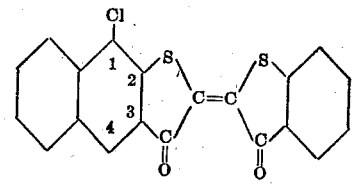

The following table shows the main properties of some of the dyestuffs obtainable according to this invention:

| | Coupling component I | Coupling component II | Color of dyestuff | Color in concentrated $H_2SO_4$ | Color of vat | Color of soaped dyeing |
|---|---|---|---|---|---|---|
| I | 1:2-thionaphthisatin. | Oxythionaphthenecarboxylic acid. | Brown red. | Light green. | Reddish golden-yellow. | Bordeaux red. |
| II | " | Oxythionaphthenecarboxylic acid and brominating. | Brown. | Green. | Gold yellow. | Bordeaux red. |
| III | " | 6-amino-oxythionaphthene. | Black brown. | Green blue. | Orange brown. | Brown. |
| IV | " | 6-amino-oxythionaphthene and brominating. | Dark blue. | Blue. | Yellow brown. | Brown. |
| V | " | 6-amino-oxythionaphthene and benzoylating. | Black brown. | Green blue. | Orange brown. | Brown. |
| VI | 4-chloro-1:2-thionaphthisatin. | Indoxyl. | Blue violet. | Green. | Olive green. | Blue violet. |
| VII | " | Oxythionaphthenecarboxylic acid. | Red. | Green. | Yellow. | Bordeaux red. |
| VIII | 4-chloro-1:2-thionaphthisatin. | Oxythionaphthenecarboxylic acid and brominating. | Red. | Green. | Yellow. | Bordeaux. |
| IX | 8-chloro-1:2-thionaphthisatin. | Oxythionaphthenecarboxylic acid. | Red. | Green. | Golden-yellow. | Violet red. |
| X | " | Oxythionaphthenecarboxylic acid and brominating. | Red. | Green. | Golden-yellow. | Violet. |
| XI | 8-chloro-2:3-thionaphthisatin. | 6-chloro-oxythionaphthenecarboxylic acid. | Dark brown. | Green. | Red yellow. | Reddish violet. |
| XII | 2:3-thionaphthisatin. | 6-chloro-oxythionaphthenecarboxylic acid. | Blue grey. | Green. | Red orange. | Violet. |
| XIII | " | 6-chloro-oxythionaphthenecarboxylic acid and brominating. | Violet. | Green. | Red orange. | Violet. |
| XIV | p-dimethylaminoanil of 2:3-thionaphthisatin. | Oxythionaphthene. | Blue grey. | Green. | Brown orange. | Greenish grey. |
| XV | 1-chloro-2:3-thionaphthisatin. | Oxythionaphthenecarboxylic acid. | Violet red. | Olive green. | Yellow. | Red violet. |
| XVI | " | Oxythionaphthenecarboxylic acid and brominating. | Violet red. | Olive green. | Yellow. | Red violet. |
| XVII | " | Indoxyl. | Reddish blue. | Blue. | Orange yellow. | Violet. |
| XVIII | " | 6-chlorooxythionaphthene. | Violet red. | Olive green. | Orange. | Red violet. |
| XIX | 5-chloro-1:2-thionaphthisatin. | Oxythionaphthenecarboxylic acid. | Red brown. | Green. | Golden yellow. | Bordeaux. |
| XX | " | Oxythionaphthenecarboxylic acid and brominating. | Dark violet. | Green. | Golden yellow. | Bordeaux. |
| XXI | 1:2-naphththioindoxyl. | 5:7-dibromoisatin. | Brown. | Violet red. | Yellow. | Brown. |
| XXII | " | 5:7-dibromoisatin chloride. | Violet. | Blue. | Golden yellow. | Blue violet. |
| XXIII | 4-chloro-1:2-naphththioindoxyl. | 5:7-dibromoisatin. | Red. | Violet red. | Yellow. | Brown. |
| XXIV | " | 2-(4'-dimethylamino)-anil of thioisatin. | Blue red. | Green. | Yellow. | Bordeaux. |
| XXV | " | α-isatin anilide. | Violet blue. | Reddish blue. | Orange brown. | Heliotrope. |
| XXVI | " | α-isatin anilide and bromination. | Violet blue. | Greenish blue. | Orange brown. | Violet. |
| XXVII | 4-chloro-1:2-naphththioindoxyl. | 5:7-dibromoisatin chloride. | Violet. | Greenish blue. | Yellow red. | Violet. |
| XXVIII | 8-chloro-2:3-naphththioindoxyl. | Dibromoisatin. | Reddish violet. | Deep green. | Golden yellow. | Violet. |
| XXIX | 2:3-naphththioindoxyl. | 5:7-dibromoisatin. | Reddish violet. | Violet. | Golden yellow. | Violet. |
| XXX | " | p-dimethylamino-thioisatin-anil. | Bluish grey. | Green. | Brown orange. | Greenish grey. |
| XXXI | " | p-dimethylamino-thioisatin-anil and bromination. | Reddish violet. | Olive green. | Brown orange. | Reddish violet. |
| XXXII | 1-chloro-2:3-naphththioindoxyl. | 5:7-dibromoisatin chloride. | Violet. | Green. | Brown orange. | Blue. |

The formula of dyestuff III is most probably:

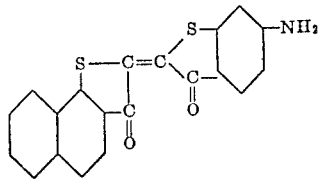

The formula of dyestuff No. V is most probably the following:

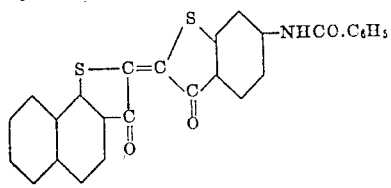

The formula of dyestuff X is most probably:

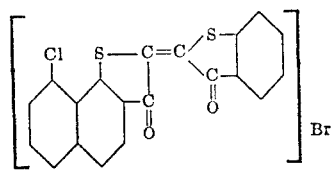

The formula of dyestuff XI is most probably:

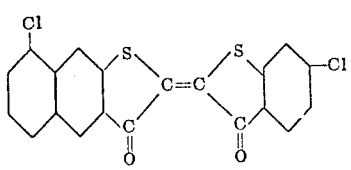

The formula of dyestuff XVIII is most probably:

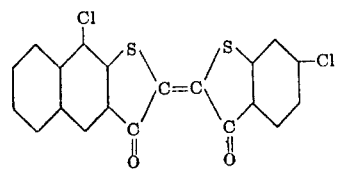

The formula of dyestuff XX is most probably:

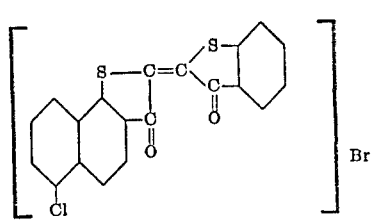

The formula of dyestuff XXVI is most probably:

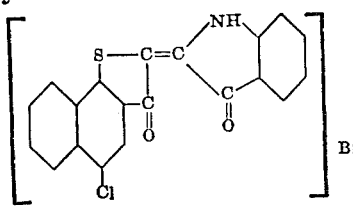

The formula of dyestuff XXVIII is most probably:

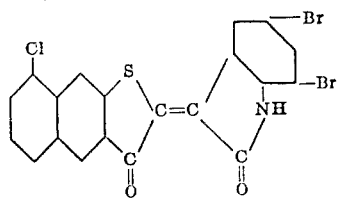

The formula of dyestuff XXXII is most probably:

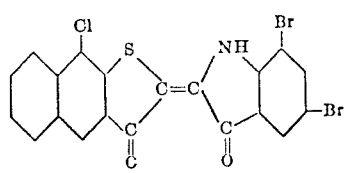

What we claim is:

1. As new products the unsymmetrical indigoid dyestuffs which are characterized by the symmetrical atom grouping:

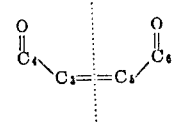

the first member of which is attached by the carbon atom $C_3$ to the sulfur atom of a thionaphthol nucleus and by the carbon atom $C_4$ to a -$\beta$-C-atom in ortho-position to this sulfur atom, and the second member of which belongs to a five membered heterocyclic complex containing a S-atom or a NH-group and condensed with a benzene nucleus which dyestuffs form dark powders which dissolve in sulfuric acid of 98 per cent strength with violet-red to green and olive color, yielding with hydrosulfite and caustic soda solution yellow to olive-green vats which dye cotton fast brown to Bordeaux, violet, blue and gray tints.

2. As new products the unsymmetrical indigoid dyestuffs which are characterized by the atom grouping

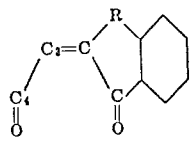

the first member of which is attached by the carbon atom $C_3$ to the sulfur atom of a halogenated thionaphthol nucleus and by the carbon atom $C_4$ to a $\beta$-C-atom in ortho-position to this sulfur atom, and in which R stands for S and NH and wherein the benzene nucleus may carry substituents, which dyestuffs form dark powders which dissolve in sulfuric acid of 98 per cent strength with reddish-blue to green and olive color, yielding with hydrosulfite and caustic soda solution yellow to olive-green vats which dye cotton fast brown to Bordeaux, violet, blue and gray tints.

3. As new products the unsymmetrical indigoid dyestuffs which are characterized by the atom grouping

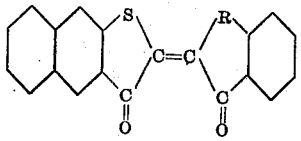

wherein the naphthalene nucleus is halogenized, R standing for NH or S and in which the benzene nucleus may carry substituents, which dyestuffs form red-violet to brown-black and green-blue powders which dissolve in concentrated sulfuric acid with red-violet to blue and olive green color, yielding with hydrosulfite and caustic soda solution yellow to orange and brown vats which dye cotton fast red-violet to green-blue tints.

4. As new products the unsymmetrical indigoid dyestuffs which are characterized by the atom grouping

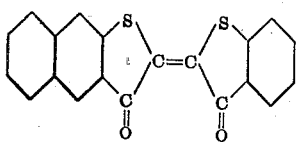

wherein the naphthalene nucleus is halogenized and in which the benzene nucleus may carry substituents, which dyestuffs form violet to brown powders which dissolve in concentrated sulfuric acid with olive-green color, yielding with hydrosulfite and caustic soda solution yellow to orange and brown-orange vats which dye cotton fast violet tints.

5. Materials dyed with the dyestuffs of claim 1.

6. Materials dyed with the dyestuffs of claim 2.

7. Materials dyed with the dyestuffs of claim 3.

8. Materials dyed with the dyestuffs of claim 4.

9. As new products the asymmetrical, sulfur containing vat dyestuffs of the formula

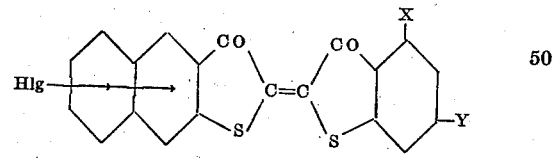

wherein X represents hydrogen or alkyl and Y represents hydrogen or halogen, and $Hl_g$ stands for a halogen having an atomic weight between 35 and 80, and the arrow indicates that the position of the halogen in the naphthalene nucleus is undetermined; which dyestuffs are violet powders, dissolving in hot concentrated sulfuric acid, with a green coloration, insoluble in water, dilute acids or alkalies, and dye textile fibers from the vat violet shades.

In witness whereof we have hereunto signed our names this 3rd day of November 1923.

HERMANN STAUDINGER.
RICHARD TOBLER.
ROBERT STOCKER.
JAKOB MÜLLER.
ARMIN BUCHER.